United States Patent [19]

Cool

[11] B 3,916,341

[45] Oct. 28, 1975

[54] R-C FEEDBACK OSCILLATOR WITH PLURAL FREQUENCY SELECTING SWITCHES PRODUCING OUTPUT SIGNAL ONLY WHEN A SINGLE SWITCH IS CLOSED

[75] Inventor: Hans Cool, Hilversum, Netherlands

[73] Assignee: U.S. Philips Corporation, New York, N.Y.

[22] Filed: Aug. 29, 1973

[21] Appl. No.: 392,753

[44] Published under the Trial Voluntary Protest Program on January 28, 1975 as document no. B 392,753.

[30] Foreign Application Priority Data

Sept. 15, 1972 Netherlands ...................... 7212510

[52] U.S. Cl. .................... 331/110; 331/48; 331/56; 331/141; 331/179

[51] Int. Cl.² ........................ H03B 3/04; H03B 5/26

[58] Field of Search ........ 331/108 B, 110, 140, 141, 331/142, 48, 56, 179, 135–137

[56] References Cited

UNITED STATES PATENTS

| | | | |
|---|---|---|---|
| 3,699,477 | 10/1972 | McKell | 331/142 |
| 3,720,887 | 3/1973 | Matthews et al. | 331/142 |

*Primary Examiner*—Siegfried H. Grimm
*Attorney, Agent, or Firm*—Frank R. Trifari; Simon L. Cohen

[57] ABSTRACT

An arrangement for generating signals for selection, in particular for use in telephone subscribers sets. The device comprises a switchable RC- oscillator which is composed of an amplifier with negative feedback and a frequency-dependent voltage divider for positive feedback which comprises resistors, capacitors and switches. The frequency-dependent voltage divider has a configuration such that, if one switch is closed, the attenuation is smaller than the amplification of the amplifier and, if two switches are closed, the attenuation is larger than the amplification.

5 Claims, 1 Drawing Figure

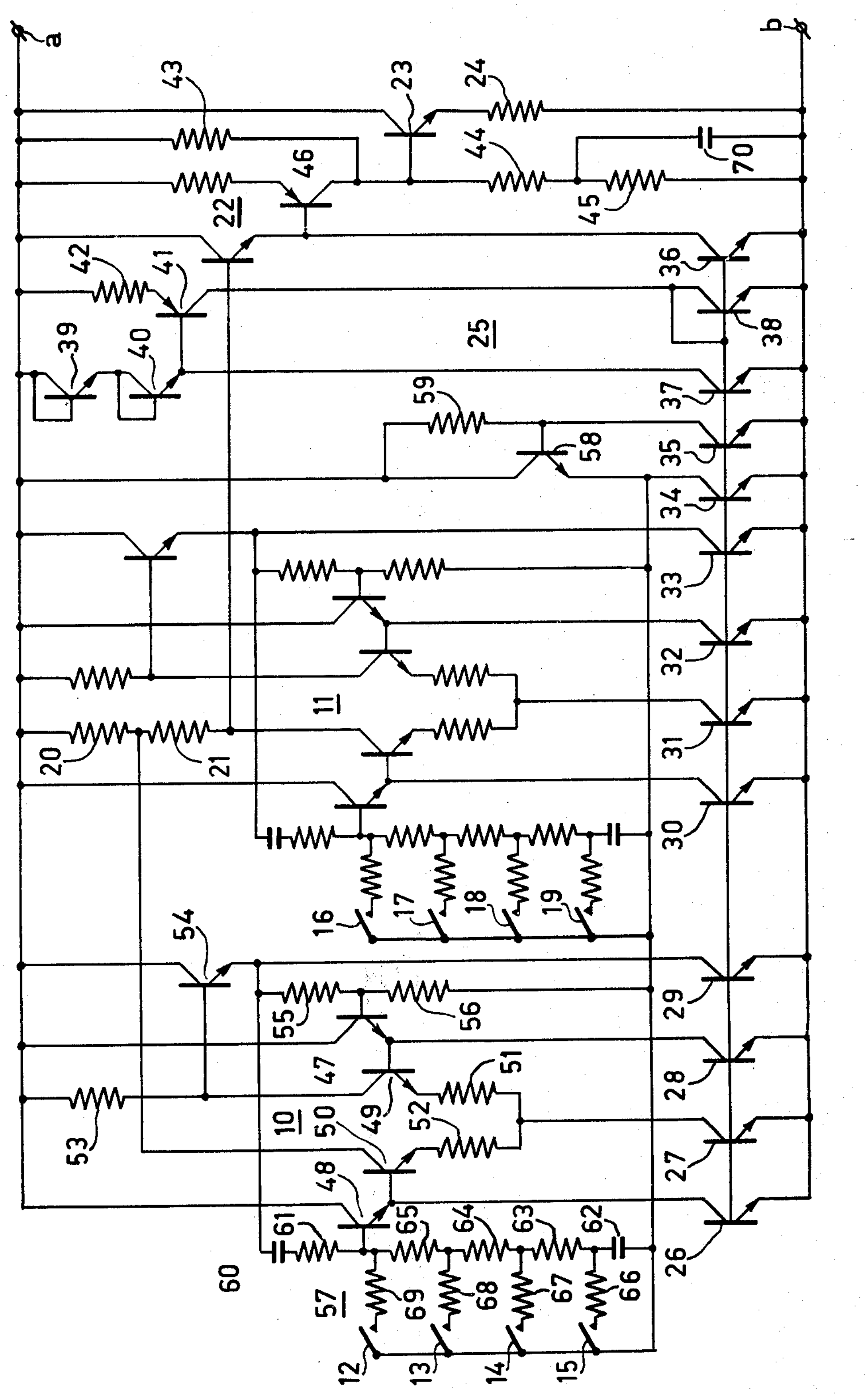

R-C FEEDBACK OSCILLATOR WITH PLURAL FREQUENCY SELECTING SWITCHES PRODUCING OUTPUT SIGNAL ONLY WHEN A SINGLE SWITCH IS CLOSED

The invention relates to an arrangement for generating signals for selection, comprising an amplifier with negative feedback and a frequency-dependent voltage divider which is connected between the output and the input of the amplifier, the said voltage divider producing a positive feedback and comprising resistors and capacitors and switches such that if one switch is closed, the output voltage of the voltage divider is in phase with the input voltage thereof at a given frequency, and is attenuated with respect to the input voltage by a factor which is smaller than the amplification of the amplifier.

Devices of this kind are used inter alia in telephone subscriber sets. Sets of this kind are provided with a keyboard by means of which the numbers can be chosen. In a commonly used telephone set, each key corresponds to a low frequency in the speech frequency band and to a high frequency in the same band, the two frequencies being simultaneously generated by the operation of a key, the combination thus characterizing a digit.

Commonly used RC-oscillators for application in the said arrangement for selection comprise a double-T filter or a Wien bridge as the frequency-determining network, and are provided with switches for tuning the frequency-determining network to the desired frequency. The attenuation of the frequency-determining network should not substantially vary with the tuning. In some cases, a second group of switches is used for separate control of the attenuation.

Some telephone administrations impose the requirement that no oscillatory signal is generated if two keys are simultaneously operated, which may occur when the keyboard is incorrectly operated.

The invention has for its object to provide an arrangement of the kind set forth in which a minimum number of switches is used and in which no oscillatory signal is generated if two switches are simultaneously closed, and in which the attenuation of the frequency-determining network is substantially independent of the frequency to which the network is tuned.

The arrangement according to the invention is characterized in that in the variable part of the frequency-dependent voltage divider the resistors which can be switched on by contacts of the switches are situated in parallel circuits which are separated by resistors having a smaller order of value such that if two switches are simultaneously operated, the voltage divider produces an attenuation, at a frequency for which the output voltage is in phase with the input voltage, which is larger than the amplification of the amplifier.

The invention will be described in detail hereinafter with reference to a single FIGURE showing the diagram of an embodiment of an arrangement according to the invention.

The FIGURE shows an arrangement for generating signals for selection on a subscriber line of a telephone set, the said signals having a frequency in the speech frequency band. A telephone set is considered in which the information for the selection is chosen by means of a keyboard, and in which each key, after having been operated, generates a combination of two signals, the frequencies of which are different, the one frequency being a frequency from a group of four frequencies which are situated in the lower part of the speech frequency band (the lower frequency band), the other frequency being a frequency from a group of four frequencies which are situated in the higher part of the speech frequency band (the higher frequency band).

The frequencies of the signals for selection are standardized by C.C.I.T.T. for the telephone administrations, and have the following values:

1. lower frequency band:
697 Hz
770 Hz
852 Hz
941 Hz

2. higher frequency band:
1209 Hz
1336 Hz
1477 Hz
1633 Hz.

The FIGURE shows two oscillators, the oscillator denoted by the general reference 10 serving to generate the frequencies of the lower frequency band, the oscillator denoted by the general reference 11 serving to generate the frequencies of the higher frequency band. These oscillators are controlled by the switches 12, 13, 14, 15 and 16, 17, 18, 19, respectively, which are operated by the keys of the keyboard which is not shown. It is to be understood that each key of the keyboard operates one of the switches 12, 13, 14, 15 and one of the switches 16, 17, 18, 19, such that when the key is operated, the switches close, whilst they are opened when the key is released.

If one of the switches 12, 13, 14, 15 is closed, oscillator 10 is set to the active state, and a signal is generated with a frequency which is assigned to the switch which closes. This signal generates a voltage across an output resistor 20. The output resistor of oscillator 11 is formed by the resistor 21 in series connection with the resistor 20. The construction and the operation of oscillator 11 are the same as those of the oscillator 10. So as to prevent repetition in the description, only oscillator 10 will be described in detail. Some telephone administrations impose the requirement that the level of the signal with a frequency from the lower band must be lower than the level of the signal with a frequency from the higher band. The resistor 21 serves for adjusting the difference between the levels to a desired value.

The voltage which is generated across the resistor 21 in series connection with resistor 20 is applied to an amplifier stage which inverts the voltage and which is denoted by the general reference 22. The voltage on the output of the stage 22 is applied to the base of the output transistor 23, the collector of which is connected to an output terminal *a*, its emitter being connected, via a resistor 24, to the output terminal *b*. The terminals *a* and *b* serve for connection of the arrangement for selection to the subscriber line.

The arrangement for selection receives its supply current from the terminals *a* and *b*. The voltage between the terminals *a* and *b* is a function of the length of the subscriber line and of the diameter of the conductors, and hence varies from subscriber station to subscriber station. This is the reason why the electronic circuits of the arrangement for selection are supplied with a constant current from a current source denoted by the general reference 25, the current of which is independent of variations of the voltage between the terminals *a* and *b*. The transistors which supply the electronic circuits with a constant current from the current source 25 are denoted by the references 26, 27, 28, 29, 30, 31, 32, 33, 34, 35, 36.

The current source 25 consists in known manner of a current source comprising the npn-transistors 37 and 38 and of a current source comprising the pnp-transistors 39, 40 and 41. The current sources are connected such that the reference current of the one source is the output current of the other source. The reference current is the emitter current of transistors 38 and 40, respectively, and the output current is the collector current of transistors 37 and 41, respectively. The value of the output current is adjusted by means of resistor 42 which is connected in the emitter current circuit of transistor 41.

The resistance for direct currents which is presented by the arrangement for selection between the terminals *a* and *b* is mainly determined by the circuit containing the transistor 23 and the resistor 24, because the major part of the direct current flows through this circuit. The telephone administrations impose the requirement that this resistance must amount to approximately 300 ohms. The adjustment of the resistance for direct currents can be effected by varying the resistor 24.

The setting of transistor 23 is determined by the voltage divider, consisting of the resistors 43, 44 and 45, and for a part by the collector current of the transistor 46 of amplifier stage 22. The latter current has such a small value that at a value of 2,200 ohms for resistor 43, a value of 180 ohms for resistor 44 and a value of 1,500 ohms for resistor 45, the direct voltage of the base of transistor 23 amounts,. with respect to the terminal *b*, to about half the value of the direct voltage of terminal *a* with respect to terminal *b*. Therefore, the voltage of the emitter of transistor 23 with respect to terminal *b* amounts to approximately half the value of the voltage of terminal *a* with respect to terminal *b*, with the result that the said resistance amounts to approximately 300 ohms for direct currents if resistor 24 has a value of 150 ohms.

The impedance for alternating currents which is presented by the arrangement for selection between the terminals *a* and *b* should amount to approximately 800 ohms in accordance with a requirement imposed by the telephone administrations. This value is realized by connecting a capacitor 70 of approximately 10 $\mu$F parallel to resistor 45.

The oscillator 10 will now be described in detail. This oscillator is of the RC-type. It comprises a two-stage amplifier; the first stage is formed by the transistors 47 and 48; the second stage is formed by the transistors 49 and 50. The second stage has current feedback by means of the resistors 51 and 52 which are connected in the circuit of the emitters of the transistors 49 and 50. The collector of transistor 49 is connected to terminal *a* via a resistor 53. This collector constitutes the output for a voltage which is fed back to the inputs of the amplifier. This feedback is effected via a transistor 54 in the collector circuit and two feedback networks in the form of voltage dividers. One network is formed by the resistors 55 and 56, and the other network is formed by a network of resistors and capacitors which is denoted by the general reference 57.

One side of the feedback networks is connected to the emitter of transistor 54; the other side is connected to the emitter of a transistor 58. The collector of transistor 58 is connected to terminal *a*, and the base is connected to terminal *a* via a resistor 59. The base is also connected to the collector of transistor 35. The transistor 58 serves to supply a direct voltage on the other side of the feedback networks, this voltage being smaller by a given amount than the voltage of terminal *a* without substantially increasing the resistance for alternating currents from this other side to terminal *a*. This function is required only to realize a correct setting of the transistors of the amplifiers of the oscillators 10 and 11.

The collector of transistor 50 is connected to terminal *a* via resistor 20. The collector of the corresponding transistor of oscillator 11 is connected, via the resistor 21 in series connection with the resistor 20, the terminal *a*. The latter collector forms the common output of the oscillators 10 and 11.

A variation of the voltage on the base of transistor 48 causes a variation of the same phase of the voltage of the collector of transistor 49. However, between the base of transistor 47 and the collector of transistor 49 the phase is reversed. The feedback of the voltage from the collector of transistor 49 to the base of transistor 47 via the resistors 55 and 56, consequently, is a negative feedback; the feedback to the base of transistor 48 is a positive feedback.

The oscillator 10 may be considered as the combination of an amplifier with a negative frequency-independent feedback and a positive frequency-dependent feedback. It will be useful to consider the amplifier together with the negative feedbacks (resistors 51, 52, 55, 56) as one unit, and to refer thereto as the amplifier with negative feedback. It is also useful to use the term damping in connection with the feedback network 57. The damping is the relation between the voltage applied to the feedback network and the voltage applied to the input of the amplifier expressed in dB.

The feedback network 57 consists of a fixed branch comprising a capacitor 60 in series connection with a resistor 61, and a variable branch comprising a capacitor 62 and the resistors 63, 64, 65, 66, 67, 68, 69. The resistors 66, 67, 68, 69 can be connected in the circuit by means of the switches 12, 13, 14, 15.

One condition for oscillation is that the impedance of the variable branch of the feedback network 57 must have the same phase angle as the impedance of the fixed branch. The voltage applied to the base of transistor 48 then has the same phase as the voltage of the output of the amplifier. A second condition is that the amplification of the amplifier with negative feedback must be equal to the damping of the feedback network. In reality, the amplification should be slightly larger than the damping (approximately 0.5 dB) so as to ensure that the amplitude of the oscillator quickly reaches its final value. The excess amplification, amounting to approximately 0.5 dB, is compensated for by an equal damping, which is caused by the limitation of the amplitude of the oscillation. This limitation takes place because the transistors 49 and 50 are supplied with one contant current which determines the maximum achievable amplitude of the oscillation.

The feedback network 57 is proportioned such that the damping amounts to approximately 10 dB, regardless of which of the switches 12, 13, 14, 15 is closed. The amplification of the negative feedback amplifier amounts to approximately 10.5 dB.

The feedback network 57 is proportioned as follows:

| Resistor | Ohms |
|---|---|
| 61 | 12.1k |
| 63 | 453 |
| 64 | 536 |
| 65 | 619 |
| 66 | 8.25k |
| 67 | 9.53k |
| 68 | 11k |
| 69 | 12.7k |
| **Capacitor** | **pF** |
| 60 | 19.6k |
| 62 | 19.6k + 300 |

The frequency-dependent feedback network of oscillator 11 has the same proportioning of resistors. The capacitor of the fixed branch has a value of 11.3K pF, and that of the variable branch has a value which is 300 pF higher than that of the fixed branch.

The construction of the feedback network 57 as shown in the FIGURE and with the above values of the resistors, i.e., with a low value of the resistors of the variable branch which are connected in series with capacitor 62 and with a high value of the resistors which can be connected parallel to the capacitor 62 by means of a switch, offers the advantage that the damping increases when two switches are closed. For the given proportioning, the increase of the damping amounts to approximately 2 dB, with the result that the damping amounts to 12 dB instead of 10 dB. The amplification amounts to 10.5 dB, so that no oscillation can occur if two keys of the selection keyboard are simultaneously operated as a result of an operating error. It is thus prevented that incorrect connections are established by such operating errors.

The closing of a switch changes the setting of the amplifier of the oscillator. In the rest state, transistor 48 receives no base current. If a switch is closed, transistor 48 receives base current via one of the resistors 66, 67, 68, 69 and a collector current is adjusted. At the same time, the setting of transistor 50 changes. The change of the collector current of transistor 50 causes the appearance of an edge of a direct current pulse in the circuit which is externally connected to the terminals *a* and *b*. When the switch is opened, an edge having the opposite direction appears.

The direct current pulse which appears during the operation of a key for selection can perform different functions in the telephone set, these functions being necessary or desirable when use is made of selection by tone-frequency signals. One of these functions is putting the microphone out of operation; another function is making the signals for selection in the telephone receiver audible; another function yet may be the removal of a short circuit for alternating currents from the output of the arrangement for selection.

It is to be noted that the data of the illustrated arrangement for selection have only an illustrative meaning and that the construction of the arrangement for selection can deviate from the illustrated embodiment in many respects without departing from the scope of the invention. For example, the amplifier of the oscillators 10 and 11 can be of the three-stage type. It is further possible to realize the negative feedback completely in the form of a current feedback in the last amplifier stage.

What is claimed is:

1. An arrangement for generating signals for selection, comprising an amplifier with negative feedback and a frequency-dependent voltage divider which is connected between the output and the input of the amplifier, the said voltage divider producing a positive feedback and comprising resistors and capacitors and switches such that if one switch is closed, the output voltage of the voltage divider is in phase with the input voltage thereof at a given frequency, and is attenuated with respect to the input voltage by a factor which is smaller than the amplification of the amplifier, characterized in that in the variable part of the frequency-dependent voltage divider the resistors which can be switched on by contacts of the switches are situated in parallel circuits which are separated by resistors having a smaller order of value such that if two switches are simultaneously operated, the voltage divider produces an attenuation, at a frequency for which the output voltage is in phase with the input voltage, which is larger than the amplification of the amplifier.

2. An arrangement as claimed in claim 1, characterized in that one branch of the frequency-dependent voltage divider is formed by the series connection of a capacitor and a resistor, the other branch of the frequency-dependent voltage divider being formed by the series connection of a second capacitor and a plurality of resistors, one end of said series connection being formed by one of the ends of the capacitor, each of the connection points between the elements of the latter series connection being connected, via the series connection of a resistor and a switch, to the said one end of the series connection.

3. An arrangement as claimed in claim 2, characterized in that the resistors which are connected in series with the second capacitor have a resistance which is lower by about a factor ten than the resistors which are connected in series with the switches.

4. An arrangement as claimed in claim 1, characterized in that the negative feedback amplifier comprises at least two stages, the negative feedback being realized by voltage feedback from the output to the input and by current feedback in the last stage.

5. An arrangement as claimed in claim 1, characterized in that the negative feedback amplifier comprises at least two stages, and in that the negative feedback is exclusively realized by a current feedback in the last stage.

* * * * *